April 13, 1954     J. DOMINICK     2,674,793
COMBINED KITCHEN UTENSIL
Filed March 23, 1953
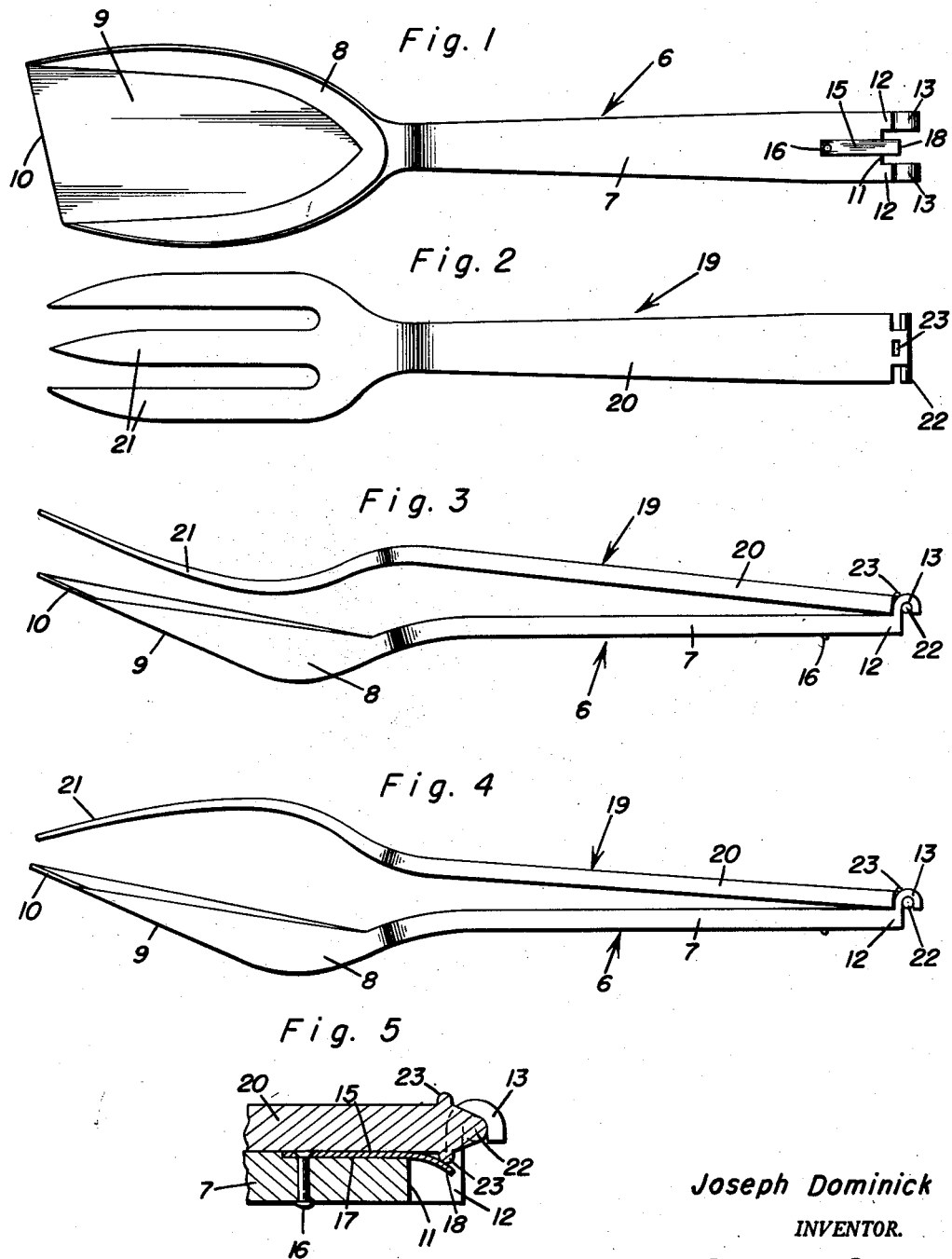
Joseph Dominick
INVENTOR.

Patented Apr. 13, 1954

2,674,793

UNITED STATES PATENT OFFICE 2,674,793

COMBINED KITCHEN UTENSIL

Joseph Dominick, Philadelphia, Pa.

Application March 23, 1953, Serial No. 343,894

2 Claims. (Cl. 30—150)

The present invention relates to new and useful improvements in combination kitchen utensils and has for its primary object to provide, in a manner as hereinafter set forth, a single implement of this character comprising a pair of tongs, a fork and a spoon which may be conveniently used with one hand for performing various tasks such, for instance, as picking up vegetables, serving, removing hot food from frying pans, etc.

Another very important object of the invention is to provide a combination kitchen utensil of the aforementioned character which comprises novel means for hingedly, detachably and reversibly connecting the fork and spoon.

Other objects of the invention are to provide a combination kitchen utensil of the character set forth which will be comparatively simple in construction, strong, durable, compact, light in weight, attractive in appearance and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:

Figure 1 is a top plan view of the spoon;

Figure 2 is a plan view of the fork;

Figure 3 is a side elevational view, showing the fork and the spoon hingedly connected;

Figure 4 is a side elevational view similar to Figure 3 but showing the fork reversed; and Figure 5 is a detail view in vertical longitudinal section on an enlarged scale through the hingedly connected end portions of the fork and spoon.

Referring now to the drawing in detail, it will be seen that the embodiment of the invention which has been illustrated comprises a spoon which is designated generally by reference character 6, said spoon being of cast aluminum or other suitable material. The spoon 6 includes a substantially flat shank or handle 7 having formed integrally with its forward end a bowl 8 in the form of a scoop. The bowl 8 includes a flat bottom portion 9 having a straight diagonal forward edge 10.

The rear or inner end portion of the spoon handle 7 is longitudinally notched or recessed as at 11 in a manner to provide a pair of bifurcations 12. Formed integrally with the free end portions of the bifurcations 12 is a pair of upstanding, inverted hooks constituting bearings 13. A longitudinal leaf spring 15 has its forward end portion riveted as at 16 on the rear or inner end portion of the spoon handle 7. A longitudinal groove 17 (see Figure 5) in the handle 7 accommodates the spring 15. The rear end portion 18 of the spring 15 is free and projects rearwardly and downwardly into the notch or recess 11 between the bifurcations 12.

Cooperable with the spoon 6 is a fork 19 which may also be of cast aluminum or other suitable material. The fork 19 comprises a substantially flat handle or shank 20 having integral tines 21 on its forward end. Projecting longitudinally from the inner or rear end of the fork handle 20 is an integral T 22. Formed integrally with the upper and lower portions of the shank or stem of the T 22 are transverse ribs or beads 23.

It is thought that the use of the implement will be readily apparent from a consideration of the foregoing. Briefly, the end portions of the T 22 are journaled in the bearings 13 for hingedly connecting the spoon 6 and the fork 19. The spring 15 yieldingly engages the T 22 in the bearings 13. The construction and arrangement also is such that the spring 15 tends to spread or open the spoon 6 and the fork 19 thereby facilitating the use of the implement as a tong with one hand. As shown to advantage in Figure 5 of the drawing, the rib or bead 23 which is lowermost rides on the free end portion 18 of the spring 15. With the parts assembled as shown in Figure 3 of the drawing, the implement may be used for conveniently handling salads, removing food from hot pans and other cooking utensils, etc. With the fork 19 reversed, as shown in Figure 4 of the drawing, the device may be used for picking up vegetables out of a receptacle and for other purposes. Of course, by disconnecting the spoon 6 and the fork 19, they may be used separately.

It is believed that the many advantages of a combination kitchen utensil constructed in accordance with the present invention will be readily understood and although a preferred embodiment of the device is as illustrated and described, it is to be understood that changes in the details of construction may be resorted to which will fall within the scope of the invention as claimed.

What is claimed is:

1. A combination kitchen utensil comprising: a fork and a spoon each including a handle, and means on one end thereof for hingedly, detachably and reversibly connecting the handles, said means including a pair of open, upstanding substantially hook-shaped bearings on one of the handles, a T on the other handle engageable in said bearings, and a longitudinal spring on said one handle projecting between said bearings and engaged with the T for yieldingly engaging same in the bearings.

2. A combination kitchen utensil comprising: a spoon including a handle, furcations on one end of said handle, substantially hook-shaped upstanding bearings integral with said furcations, a fork including a handle, a T on one end of the fork handle journaled in the bearings for hingedly, detachably and reversibly connecting the spoon and fork, transverse ribs on the T, and a leaf spring on the spoon handle comprising a free end portion extending between the furcations and engageable selectively with the ribs for yieldingly securing the T in the bearings.

References Cited in the file of this patent

UNITED STATES PATENTS

| Number | Name | Date |
|---|---|---|
| D. 166,100 | Roop | Mar. 4, 1952 |

FOREIGN PATENTS

| Number | Country | Date |
|---|---|---|
| 6,486 | Great Britain | Mar. 24, 1908 |
| 30,497 | Great Britain | Dec. 30, 1909 |